United States Patent [19]
Dickson

[11] Patent Number: 5,650,999
[45] Date of Patent: *Jul. 22, 1997

[54] VOICE OVER DATA COMMUNICATION SYSTEM

[76] Inventor: William David Dickson, 17955 Caminito Pinero, San Diego, Calif. 92128

[*] Notice: The term of this patent shall not extend beyond the expiration date of Pat. No. 5,553,063.

[21] Appl. No.: 611,383

[22] Filed: Mar. 5, 1996

Related U.S. Application Data

[63] Continuation of Ser. No. 304,403, Sep. 12, 1994, Pat. No. 5,553,063.

[51] Int. Cl.⁶ ................... H04B 1/56; H04L 7/10
[52] U.S. Cl. ............... 370/231; 370/276; 370/507; 370/522; 379/93.28; 375/220; 375/357; 375/358
[58] Field of Search ............. 370/24, 29, 79, 370/95.1, 103, 110.1, 276, 294, 465, 229, 231, 230, 507, 522; 379/90, 93, 96, 97, 98; 375/220, 222, 357, 358

[56] References Cited

U.S. PATENT DOCUMENTS 4,907,225  3/1990  Gulick et al. ............. 370/94.1
5,214,650  5/1993  Renner et al. ............. 370/110.1
5,343,516  8/1994  Callele et al. ............. 379/98

*Primary Examiner*—Russell W. Blum
*Attorney, Agent, or Firm*—Roger M. Rickert

[57] ABSTRACT

A system for full duplex real time two-way voice and data communication between a pair of computer terminal locations is disclosed. Analog voice signals are converted to digital form at one terminal location and those digital signals are interleaved with other digital information for transmission to the other terminal location. A value for the number of bytes, in a data packet is first established, and then values for the number of bytes and the location dedicated to the transmission of voice information, control information, and data transmission within such fixed size data packets is established. Thereafter, a sequence of data packets with synchronization bytes in the voice byte locations is transmitted from each computer terminal location and received by the other of the terminal location. Upon receipt thereof, an acknowledgement of the receipt is transmitted back to the originating location to indicate the establishment of synchronization between the two locations. Thereafter a sequence of data packets with the voice byte locations thereof dedicated to the transmission of voice information is transmitted from each of the computer terminal locations to the other.

4 Claims, 16 Drawing Sheets

```
IF T1RDY INDICATES SP1 TX BUFFER IS EMPTY, THEN         (T1RDY IS SET IN ISR, P1SYNISR)
  RESET T1RDY
  IF T1 PACKET STATE = DATA
    IF TRANSMITTING FULL DATA PACKET
      1. MOVE DATA FROM ROEB TO SP1.
      2. ADJUST ROEB OUTPUT POINTER (CIRCULAR BUFFER).
      3. DECREMENT ROEB DATA COUNT.
    ELSE IF EMPTY DATA PACKET, THEN SEND DATA FILL BYTE TO SP1.
    IF FINISHED SENDING DATA PACKET, THEN SET T1 PACKET STATE = VOICE.
  ELSE IF T1 PACKET STATE = VOICE
    1. DECIDE WHICH BUFFER TO SEND
    2. IF LISTEN BUFFER IS READY, THEN
       MOVE DATA FROM LISTEN BUFFER TO SP1,
       AND ADJUST LISTEN BUFFER OUTPUT POINTER TO NEXT LOCATION.
       IF END OF BUFFER, THEN
         SET T1 PACKET STATE = SYNC,
         RESET FLAGS THAT INDICATED THIS LISTEN BUFFER WAS READY TO SEND,
         AND SET LISTEN BUFFER OUTPUT POINTER TO BOTTOM OF NEXT BUFFER TO SEND.
  ELSE IF T1 PACKET STATE = SYNC
    1. CHECK ROEB DATA COUNT AND PC FLOW INFORMATION RECEIVED FROM REMOTE TO
       DECIDE IF NEXT DATA PACKET WILL BE FULL, 1 BYTE, OR EMPTY.
    2. IF PC FLOW CONTROL IS ENABLED, THEN
         IF RIEB DATA COUNT IS GREATER THAN HIGH THRESHOLD, THEN
           SET PC FLOW VARIABLE TO FLOW OFF REMOTE PC DATA.
         ELSE IF RIEB DATA COUNT IS LESS THAN A LOW THRESHOLD, THEN
           SET PC FLOW VARIABLE TO FLOW ON REMOTE PC DATA.
    3. PUT DATA PACKET SIZE, LOCAL SYNC STATUS AND REMOTE PC FLOW INFORMATION IN
       CONTROL DATA AND SEND CONTROL DATA TO SP1.
    4. SET T1 PACKET STATE TO DATA OR D1SBY AS INDICATED BY ROEB IN STEP 1.
    5. SET FLAG TO INDICATE SEND FULL PACKET OR EMPTY PACKET.
  ELSE IF T1 PACKET STATE = D1SBY (SEND 1 DATA BYTE IN PACKET)
    1. MOVE DATA FROM ROEB TO SP1.
    2. ADJUST ROEB OUTPUT POINTER (CIRCULAR BUFFER).
    3. DECREMENT ROEB DATA COUNT.
    4. SET T1 PACKET STATE = DATA AND SET FLAG TO INDICATE SEND EMPTY PACKET.
```

FIGURE 7B

VOICE OVER DATA COMMUNICATION SYSTEM

CROSS-REFERENCE TO RELATED APPLICATION

This application is a continuation of application Ser. No. 08/304,403 filed Sep. 12, 1994, now U.S. Pat. No. 5,554,063.

SUMMARY OF THE INVENTION

The present invention relates generally to full duplex real time two-way voice and data communication over conventional analog telephone links such as the public-switched telephone network or analog leased lines, and more particularly to such communication where a predetermined portion of each successive data packet contains digitally encoded voice or other audio information while another predetermined portion contains other digital data.

The digital transmission of voice information is well known. For example, U.S. Pat. No. 5,177,734 provides for full duplex transmission of digitally encoded voice information or other data. U.S. Pat. No. 5,153,918 teaches a "secure" communication system where voice data is digitally encrypted. The transmission of data over a communication link during pauses in speech communication is also known, for example, in U.S. Pat. No. 5,187,591.

U.S. Pat. No. 5,136,586 discloses a telephone line communication scheme where audio voice signals are time compressed preparatory to transmission and the resulting "free" or unoccupied time is filled with digital data to be transmitted therewith. In this patented arrangement, voice signals over a fixed time interval are converted to a digital form and stored. During the next time interval, the stored digital form is read back out, but at an increased rate thereby leaving a portion of the subsequent time interval available for other digital data. The "boundary" between the voice signals and the other digital data may be varied to accommodate the digital data transmission needs. Thus, this patented system performs time multiplexing of analog signals yielding good quality voice communication, but very low host computer data rates. The system employs guard band signals and reverts to full analog mode if the line conditions are so noisy that the guard band signals can not be reliably detected. It would be desirable to provide a voice over data system which multiplexes digital signals and allows high host computer data rates. It would also be desirable to provide such a system which is more nearly immune to line noise problems.

Among the several objects of the present invention may be noted the provision of a full duplex real time two-way conventional telephone line voice over data communication system which meets the above goals and overcomes the noted prior art deficiencies; and the provision of a scheme for transmitting and receiving both digitally encoded audio signals and other digital data requiring less supervisory or housekeeping space within the transmitted information. These as well as other objects and advantageous features of the present invention will be in part apparent and in part pointed out hereinafter.

In general, contemporaneous full duplex real time two-way voice and data communication is facilitated between a pair of computer terminal locations by first establishing a value for the number of bytes in a data packet and within those data packets, establishing values for the number of bytes and the location dedicated to the transmission of voice information, control information, and data transmission respectively. Thereafter, a sequence of data packets with synchronization information in certain ones of the voice byte locations may be transmitted from each computer terminal location and received by the other of the terminal locations. Upon receipt thereof, an acknowledgement of the receipt is transmitted back to indicate the establishment of synchronization between the two locations. Thereafter a sequence of data packets with the voice byte locations thereof dedicated to the transmission of voice information is transmitted from each of the computer terminal locations to the other. As used herein, the term "byte" is meant to include a single bit or a group of binary digits operated upon or otherwise treated as a unit.

Also in general, and in one form, contemporaneous full duplex real time two-way voice and data communication between first and second computer terminal locations is achieved by transmitting from each location a sequence of data packets with synchronization bytes in certain locations within each data packet and receiving at each terminal location the transmitted sequence of data packets. Upon verified receipt of the synchronization bytes, an acknowledgement is transmitted to indicate the establishment of synchronization between the two locations. Thereafter a sequence of data packets is transmitted from each of the computer terminal locations. Certain ones of the data packets include control bytes including an acknowledgement of continued synchronization on the part of the receiving location, the portion of the packet dedicated to data transmission, and an indication to the transmitting location of the ability of the receiving location to receive further data transmission. The control bytes of received packets are continually analyzed for an indication of loss of synchronization at the transmitting location and, upon receipt of an indication of such a loss of synchronization at the transmitting location, resuming transmitting from the receiving computer terminal location a sequence of data packets with synchronization bytes in certain locations within each data packet. The received packets are also continually analyzed for an indication of loss of synchronization at the receiving location and, upon detecting an indication of loss of synchronization at the receiving location, transmitting from the receiving computer terminal location a sequence of data packets with an indication of loss of synchronization within the control bytes.

BRIEF DESCRIPTION OF THE DRAWING

FIGS. 7A and 7B when joined with FIG. 7A above FIG. 7B form FIG. 7, a more detailed state description of the SYNCHRONIZATION STATE of FIG. 5;

Corresponding reference characters indicate corresponding parts throughout the several views of the drawing.

Figure 1A:
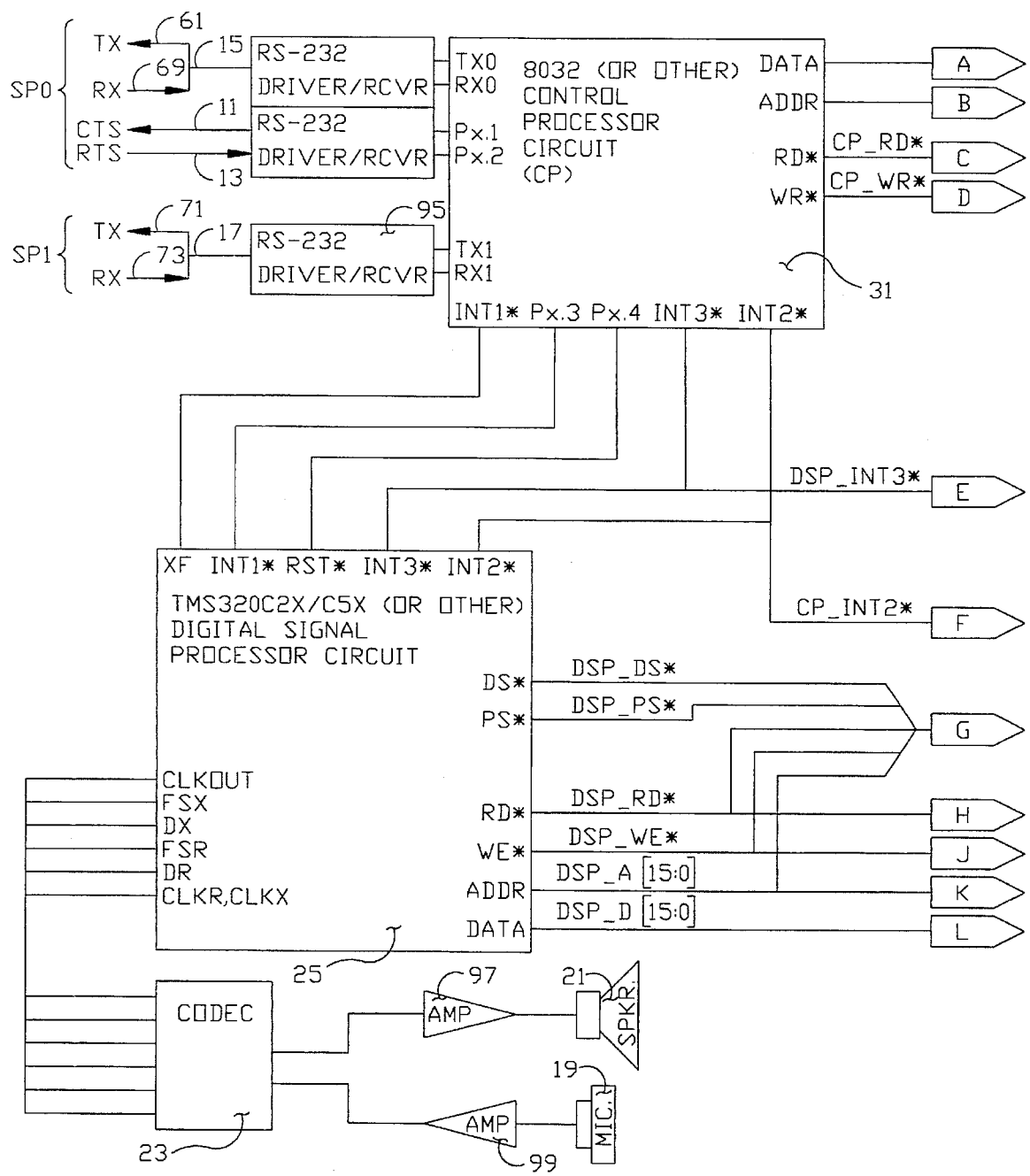
FIGS. 1A and 1B when Joined at bullets A–L with FIG. 1A on the right form FIG. 1, a schematic block diagram of the circuitry located at one computer terminal location for the simultaneous transmission and reception of digitized voice and other digital data.
Figure 1B:
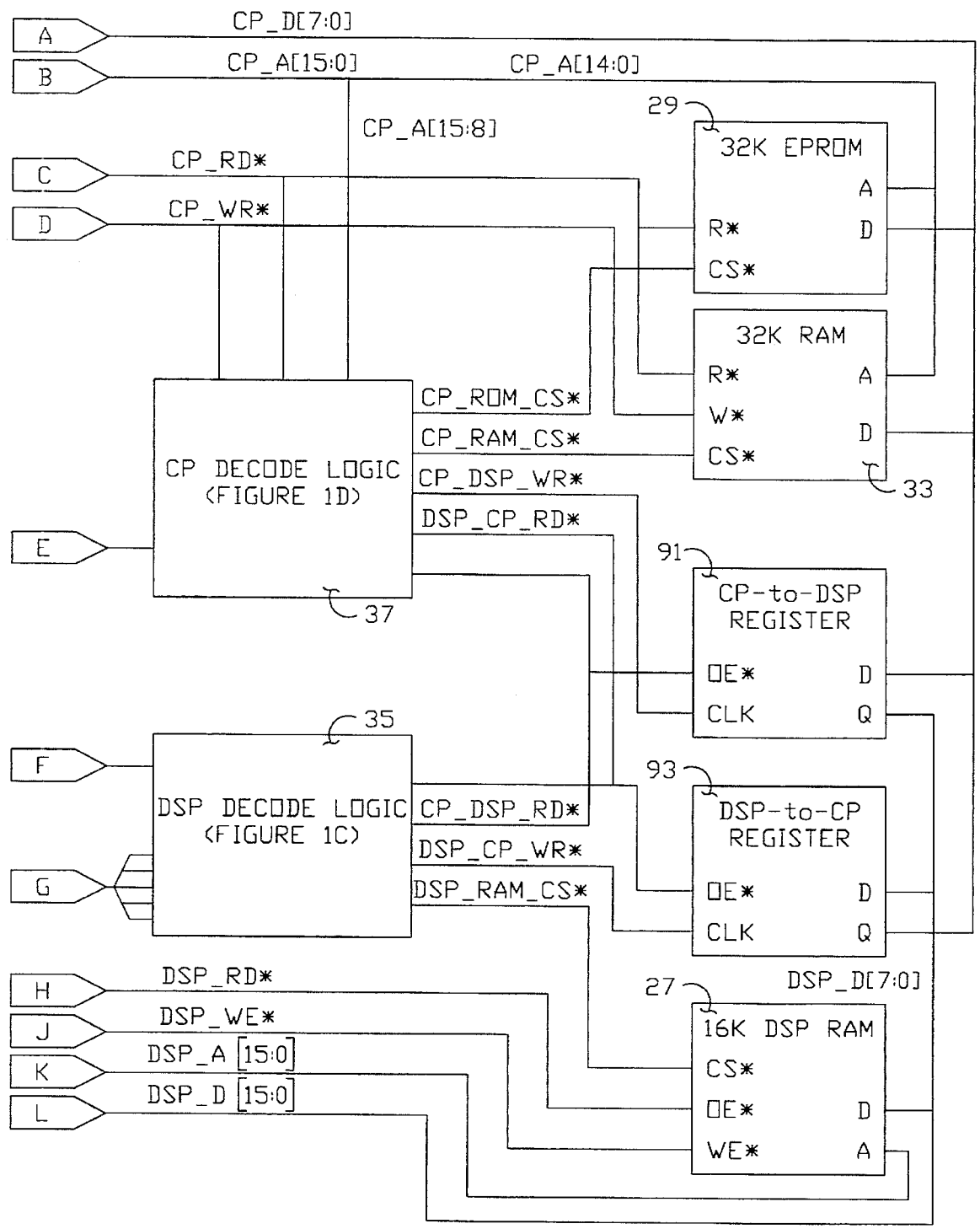

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

In FIG. 1, digital information is transferred to or from a serial port SP0 of a personal computer or similar digital device connected to lines 11, 13 and 15. Digital information is transferred to or from a conventional modem on line 17. Analog audio information such as voice data is received by microphone 19 and converted to a digital form by a voice digitizing circuit 23. Received digital voice data is converted to an analog form by the circuit 23 and the resulting analog audio signals are provided to a listener on speaker 21. A digital signal processing circuit 25 converts the digital input from the voice digitizer circuit 23 to a form suitable for transmission and reconstruction into recognizable voice signals at a remote location. The digital signal processor may, for example, operate under CELP or a similar signal processing program stored in the random access memory 27. The software associated with the present invention is stored in EPROM 29 and is executed by microprocessor 31 to suitably combine or separate the computer data and the digitally encoded voice data. The buffer circuits utilized during that combining or separating are located in the random access memory circuit 33.

The Control Processor Circuit 31 may be constructed using an Intel 8032 processor or one of many other commercially available control or general purpose type processors. This circuit includes interface logic to provide the port (Px.1–Px.4) signals, 8-bit bidirectional data bus (DATA), 16-bit address bus (ADDR), and memory read (RD*) and write (WR*) signals. It also, includes the logic required to implement 2 serial ports (SP0 and SP1) that are compatible with the serial ports found on most personal computers and commercial modems. Many processors include the logic to provide these interface and serial port signals with very little additional external logic required. The Control Processor 31 executes the voice over data program that is stored in external read only memory 29. Some processors include internal ROM. In large volume production applications the voice over data program might be stored in the Control Processor internal ROM and the external 32K EPROM could be eliminated. Another method of eliminating the external 32K EPROM is to put a loader program in the Control Processor internal ROM so that the voice over data program could be downloaded from the host computer and stored in the external RAM 33. The serial port interfaces, SP0 and SP1, may include signals not shown in FIG. 1 such as signal grounds and data clock signals for synchronous interfaces. Also if the voice over data system is combined with a modem or implemented in hardware meant for internal use in a host computer then the serial interfaces might be replaced with parallel interfaces.

The port signals, Px.1–Px.4, can be implemented with external latches and decode logic if they are not available directly from the processor. The Px.1 (CTS) output port signal is level shifted by an RS-232 driver circuit to generate CTS. CTS is the serial port 0 data flow control output signal to the host computer. If hardware flow control is enabled, the CTS output signal is used to start and stop data flow from the host computer on RX0. The Px.2 (RTS) input port signal is used to sense the state of RTS through an RS-232 receiver circuit. RTS is the serial port 0 data flow control input signal from the host computer. If hardware flow control is enabled, the host computer can use this input signal to start and stop data flow to the host computer on TX0. The Px.3 output port signal is used to drive a maskable interrupt input to the DSP 25. This signal is not used currently, but is available for future expansion. It can be used, for example, to signal to the DSP 25 that the CP 31 has written control/status rather than voice data information to the CP-to-DSP register 91. Control information can be used to cause the DSP to change voice processing or to output silence. The Px.4 output port signal is used to reset the digital signal processor (DSP) circuit.

Some of the interrupt signals listed below are used as status inputs to the CP. If the interrupt inputs are not available for the processor used, then these inputs can be port input signals similar to Px.2 described above. INT1* is a negative edge triggered maskable interrupt that can be used as either an interrupt or status input to the CP. This input is not currently used, but is available for future expansion. It can be used, for example, to signal to the CP 31 that the DSP 25 has written control/status rather than voice data information to the DSP-to-CP register 93. One use of control information would be to signal to the CP that the DSP has detected silence at the microphone 19 input. If there is no voice data to transmit then the full telephone channel bandwidth is available for transferring host computer data. INT2* is a negative edge triggered maskable interrupt that can be used as either an interrupt or status input to the CP. INT2* is used to signal to the CP that the DSP has written data to the DSP-to-CP register 93. INT2* is currently used as an interrupt input. INT3* is a negative edge triggered maskable interrupt that can be used as either an interrupt or status input to the CP. INT3* is used to indicate to the CP that the DSP has read the data last written to the CP-to-DSP register 91. INT3* is currently used as a status input. DATA is an 8-bit bidirectional data bus to the CP. ADDR is a 16-bit address bus output from the CP. RD* is a low active external program or data memory read signal. WR* is a low active external memory write signal.

The RS-232 Driver/Receivers such as 95 are voltage level conversion circuits that convert the TTL or CMOS logic level signals input and output by the Control Processor to RS-2S2 compatible voltage level signals.

Turning now to the digital signal processor 25, this circuit can be constructed with one of the digital signal processors in the Texas Instrument TMS320C2x or TMS320C5x family or with one of the other commercially available digital signal processors. This circuit performs the voice compression and decompression processing. Digitized voice data are input/output by a codec 23 connected to this DSP and the compressed voice data are input and output through the CP-to-DSP register 91 and DSP-to-CP register 93 to the Control Processor. The voice compression program executed by this DSP is downloaded from the Control processor 31 through the CP-to-DSP register 91 and stored in the 16K DSP RAM 27. Some of these digital signal processors are available with internal ROM and/or RAM. Use of the internal ROM or RAM in these devices will allow elimination of part or all of the external 16K DSP RAM 27.

The DSP circuit 25 in FIG. 1 shows memory interface signals, control signals to the Control Processor, and a serial interface to the Codec. The signals shown are available on the T. I. TMS320C2x/C5x processors. The following signals are used to interface the DSP circuit 25 to the codec circuit 23. CLKOUT is a master clock signal to the codec circuit 23. FSX transmits frame sync signals. DX transmits data. FSR receives frame sync signals. DR receives data. CLKR, CLKX receive and transmit data clock and may be connected together.

The following signals are used to interface to memory and I/O ports. DS* is a low active data select signal which is active during DSP data memory read and write cycles. PS* is a low active program select signal which is active during DSP program memory read and write cycles. RD* is a low active DSP external data memory, program memory, or I/O read signal. WE* is a low active DSP external data memory, program memory, or I/O write enable signal. ADDR is a 16-bit DSP address bus. DATA is a 16-bit DSP bidirectional data bus.

The following signals are used to interface to the CP 31. Some of the INT signals listed below are used as status inputs to the DSP 25. Status inputs directly to the DSP or implemented in the DSP Decode Logic may be used instead of interrupt inputs. INT1* is a negative edge triggered maskable interrupt that can be used as either a interrupt input or status input to the DSP. This input is not currently used, but is available for future expansion. It can be used, for example, to signal to the DSP that the CP has written control/status rather than voice data information to the CP-to-DSP register 91. Control information can be used to cause the DSP to change voice processing or to output silence. INT2* is a negative edge triggered maskable interrupt that can be used as either a interrupt input or status input to the DSP. INT2* is used to indicate to the DSP that the CP has read the data last written to the DSP-to-CP register 93. INT2* is currently used as a status input. INT3* is a negative edge triggered maskable interrupt that can be used as either a interrupt input or status input to the DSP. INT3* is used to signal to the DSP that the CP has written data to the CP-to-DSP register 91. INT3* is currently used as an interrupt input. RST* is a low active DSP reset signal. XF is an external flag output. This status/control output from the DSP is not currently used but is available for future expansion. It can be used, for example, to signal to the CP that the DSP has written control/status rather than voice data information to the DSP-to-CP transfer register 93. One use of control information would be to signal to the CP that the DSP has detected silence at the microphone input. If an external flag output is not available from the DSP then a functionally equivalent signal could be generated by logic added to the DSP DECODE LOGIC.

The Codec circuit 23 is used to digitize voice signals and transfer the voice samples to the DSP 25. An example is the Texas Instruments TLC32044 voice-band analog interface circuit. Connected to the codec circuit 23 is an output amplifier 97 driving a speaker 21, telephone handset earphone, or other audio output device. The output amplifier 97 may not be required. Also shown connected to the codec circuit 23 is a microphone 19 and microphone buffer amplifier 99. Again, the amplifier may not be needed.

The read only memory 29 is used as program memory by the CP. The I/O signals include a low active read signal (R*), a low active chip select (CS*), 15 address bus inputs (A), and 8 data bus outputs (D). The random access memory 33 is used as data and program memory by the CP. The I/O signals include a low active read signal (R*), a low active chip select (CS*), a low active write signal (W*), 15 address bus inputs (A), and 8 bidirectional data bus signals (D). The CP-to-DSP register 91 and DSP-to-CP register 93 are used to transfer voice data or control/status information from the CP to the DSP or from the DSP to the CP. These 8-bit latches or flip-flops with 3-state outputs are functionally similar to 74AS374 devices. The I/O signals include an 8-bit data input (D), an 8-bit data output (Q), a low active output enable (OE*) and a clock input (CLK). The Q outputs go to a high impedance state when the output enable is not active. Input data is latched on the rising edge of the clock input. These latches and some decode logic may be eliminated if the DSP or CP contains internal interface registers. For example, the Motorola 56001 contains internal host processor interface registers that would replace these external latches and the associated external decode logic. The 16K DSP random access memory 27 is used as data and program memory by the DSP. The I/O signals include a low active output enable (OE*), a low active chip select (CS*), a low active write enable (WE*), 14 address bus inputs (A), and 8 bidirectional data bus signals (D).

Figure 1D:
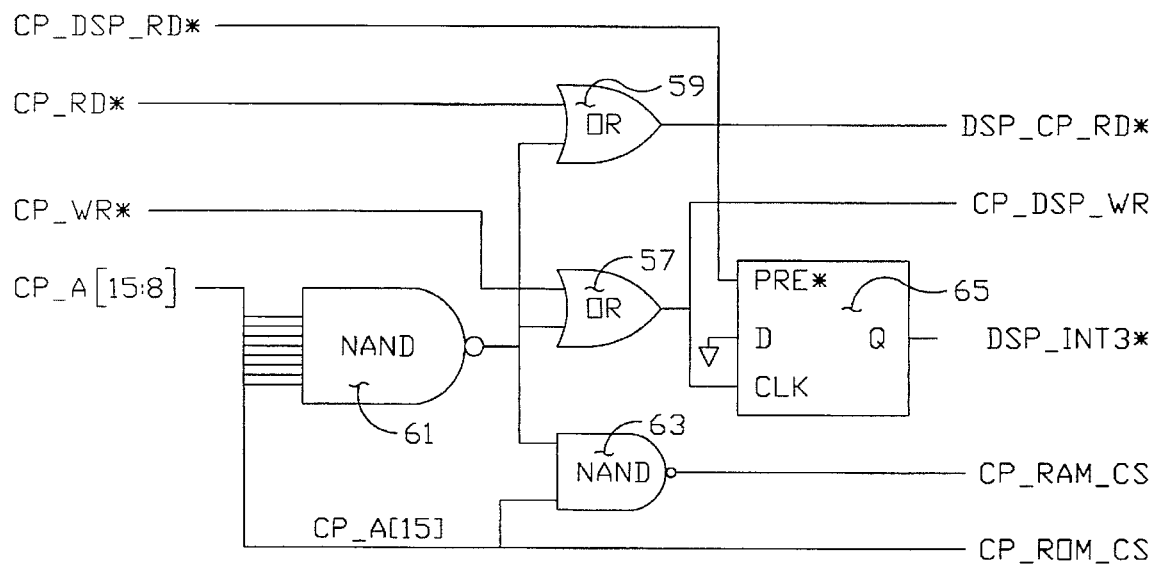
FIG. 1D is a schematic diagram of exemplary control processor decode logic suitable for use in FIG. 1A.
Figure 1C:
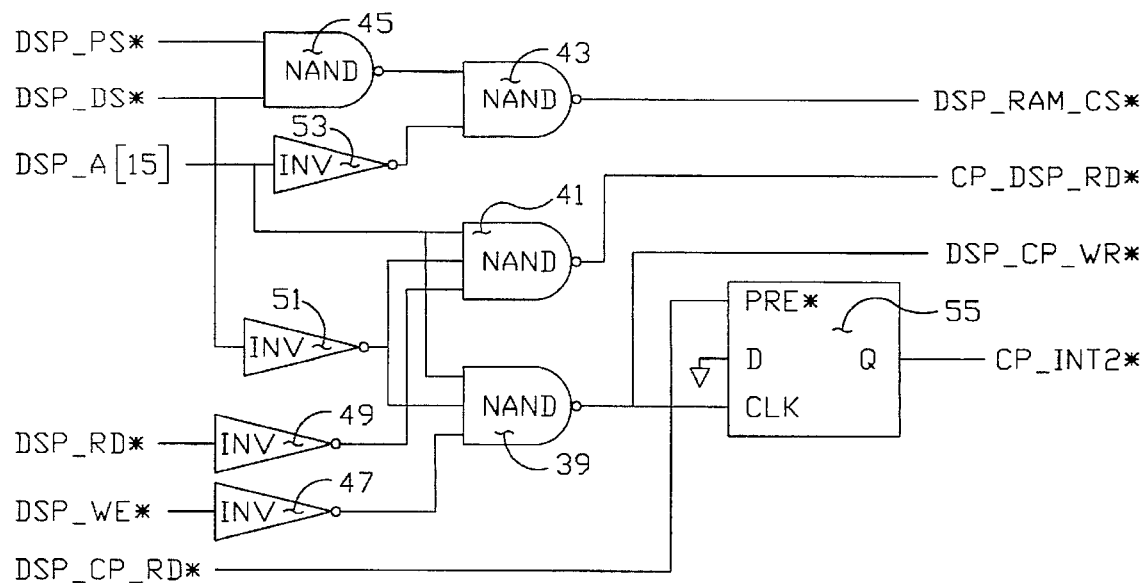
FIG. 1C is a schematic diagram of exemplary digital signal processor decode logic suitable for use in FIG. 1A.

Several gates forming one implementation of the digital signal processor decode logic 35 are shown in FIG. 1C. These include four NAND gates 39, 41, 43 and 45, four inverters 47, 49, 51 and 53, and a D-type flip-flop or set/reset latch 55. One embodiment of central processor decode logic 37 is illustrated in FIG. 1D. This logic is implemented using two OR gates 57 and 59, NAND gates 61 and 63, and another D-type flip-flop or set/reset latch 55. Decode logic 35 and 37 together constitute decoding logic for coordinating the operation of the processors 25 and 31, and memory.

The central processor decode logic 37 of FIG. 1D is logic: to interface the EPROM 29, RAM 33, and data transfer registers 91 and 93 to the Control Processor 31. The interface shown works with a 64K address space. Read only memory, used for program storage, is mapped in the lower 32K. The upper 32K of address space except for the last 256 locations is used for random access memory which can be data and program memory. The last 256 locations are reserved for registers to communicate with the DSP. The register addresses are not fully decoded to reduce the decode logic required. CP_WR* is a low active CP external write signal which is active during CP writes to external memory or registers. CP_RD* is a low active CP external read signal which is active during CP reads from external memory or registers. CP_A[15:8] is the upper 8 bits of the Control Processor address bus. CP_ROM_CS* is a low active read only memory chip select signal. CP_RAM_CS* is a low active random access memory chip select signal. CP_DSP_WR* is a low active CP-to-DSP register write signal. DSP_CP_RD* is a low active DSP-to-CP register read signal. DSP_INT3* is a low active signal used to indicate that the CP 31 has written to the CP-to-DSP register 91. This signal is used as an interrupt or status input to the DSP to cause the DSP 25 to read the CP-to-DSP register 91. It is used as an interrupt or status signal to the CP to indicate when the DSP has read the data previously written in the CP-to-DSP register. DSP_INT3* is cleared by CP_DSP_RD* when the DSP reads the CP-to-DSP register 91.

Figure 2A:
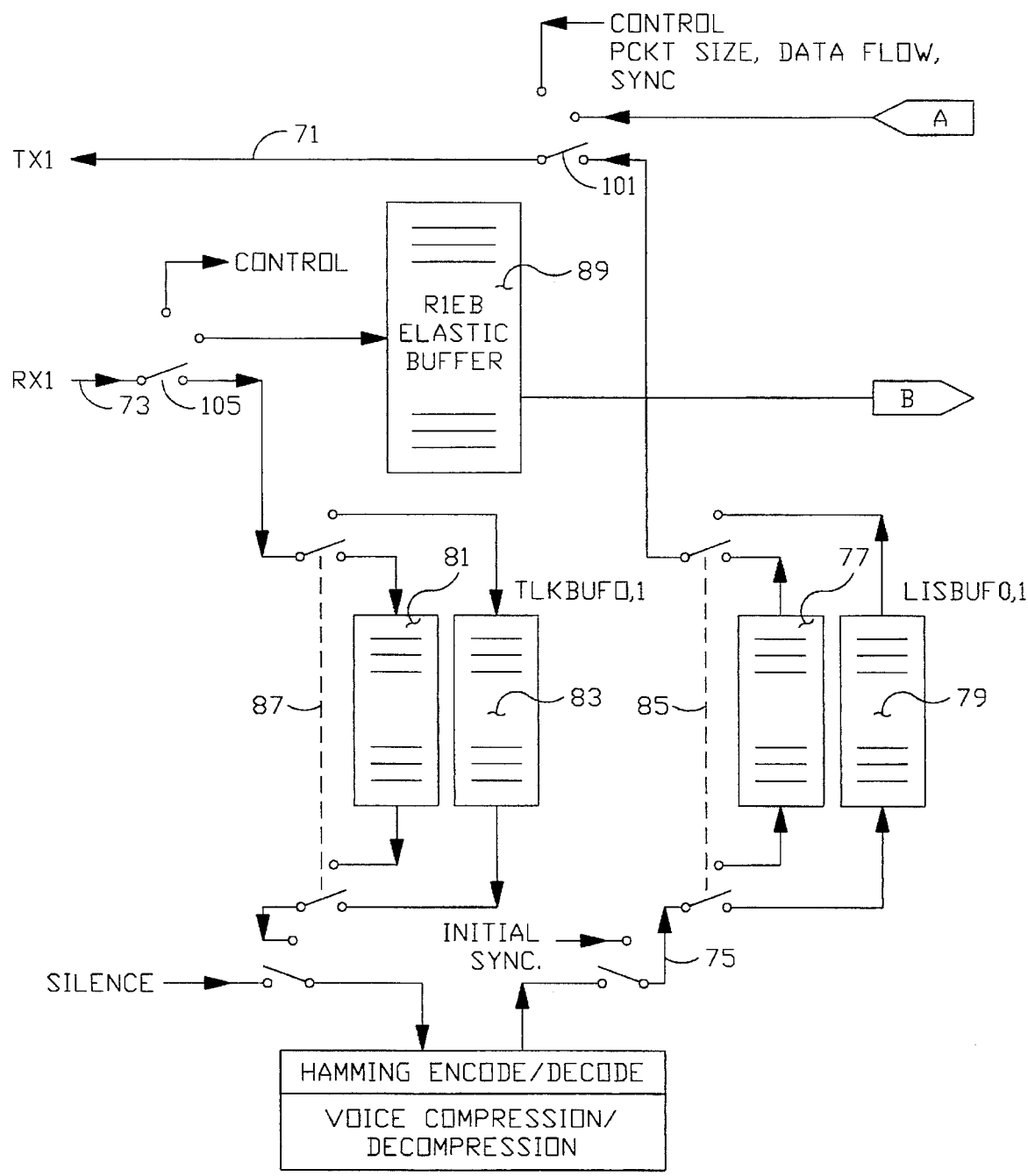
FIGS. 2A, 2B and 2C when joined at bullets A and B form FIG. 2, a functional block diagram of system of FIG. 1.
Figure 2C:
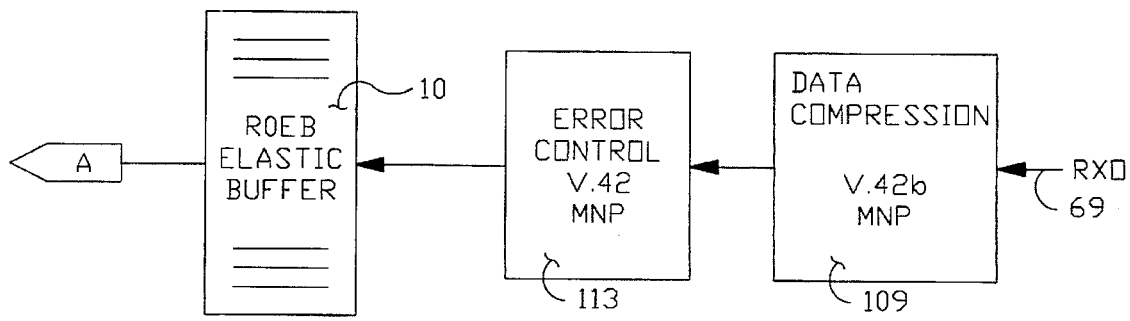
Figure 2B:
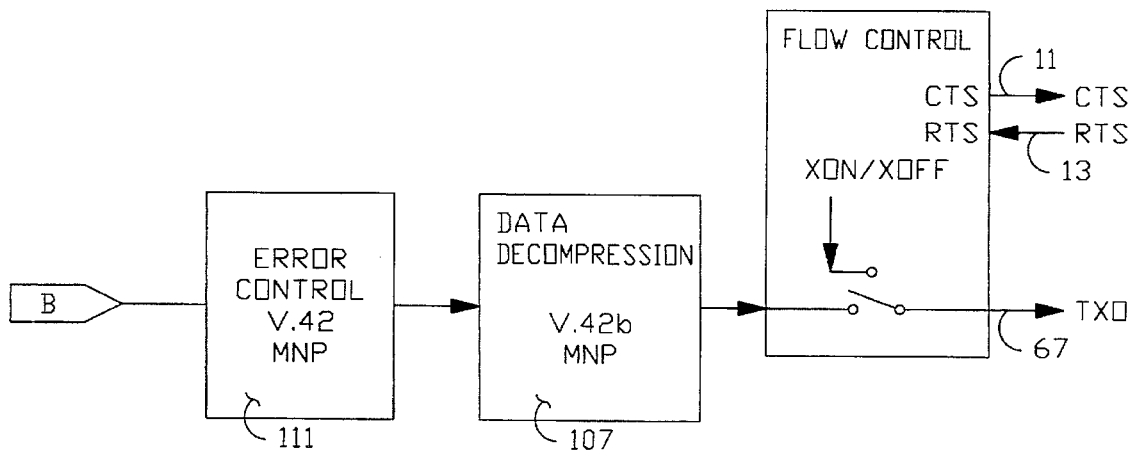

The DSP decode logic 35 of FIG. 1C is logic to interface the RAM 27, and data transfer registers to the Digital Signal Processor 25. The interface shown works with a 64K address space. The 16K DSP RAM 27 is mapped into the lower 32K of DSP program and data memory spaces. The RAM is used as both program and data memory. The CP-to-DSP and DSP-to-CP registers 91 and 93 are mapped in the upper 32K of DSP data memory. The addresses are not fully decoded to reduce the decode logic required. DSP_PS* is a low active DSP program store select and is active when the DSP accesses external program memory. DSP_DS* is a low active DSP data store select which is active when the DSP accesses external data memory. DSP_A[15:0] is a 16-bit DSP address bus. Bit 15 is the most significant and bit 0 is the least significant bit. DSP_RD* is a low active DSP external read signal and is active during data memory, program memory, or I/O read cycles. DSP_WE* is a low active DSP external write enable which is active during data memory, program memory, or I/O write cycles. DSP_RAM_CS* is a low active DSP RAM chip select signal. CP_DSP_RD* is a low active CP-to-DSP register read signal. DSP_CP_WR* is a low active DSP-to-CP register write signal. CP_INT2* is a low active signal used to indicate the DSP 25 has written to the DSP-to-CP register 98. This signal causes the CP 31 to read the DSP-to-CP register 93 and is cleared by CP_DSP_RD* when the CP reads the register. CP_INT2* is also used as status input to the DSP to indicate that the CP has read the data previously written to the DSP-to-CP In FIG. 2, the serial port 15 has been identified as separate transmit 67 and receive 69 lines. Similarly, the modem line 17 now appears as separate transmit 71 and receive 73 lines. Digitally encoded voice data is supplied from the digital signal processor 25 on line 75 to a pair of "listen" buffers 77 and 79. Similarly, incoming digital voice data is supplied to the pair of "talk" buffers 81 and 83. The ganged switch 85 allows one buffer, 79 in the position shown, to accumulate digital voice data and when that buffer is full, changes to dump the accumulated data from buffer 79 to line 71 while new voice is accumulated by buffer 77. Switch 87 functions similarly for incoming digital voice data. At the transition between transmitted voice bytes and data bytes, switch 101 moves from the position shown to transmit either data bytes from elastic buffer 103 or a control byte. Switch 105 operates similarly, for received data. Incoming or outgoing computer data may be decompressed at 107 or compressed as at 109 and somewhat conventional error control 111 and 113 may be employed.

Figure 3A:
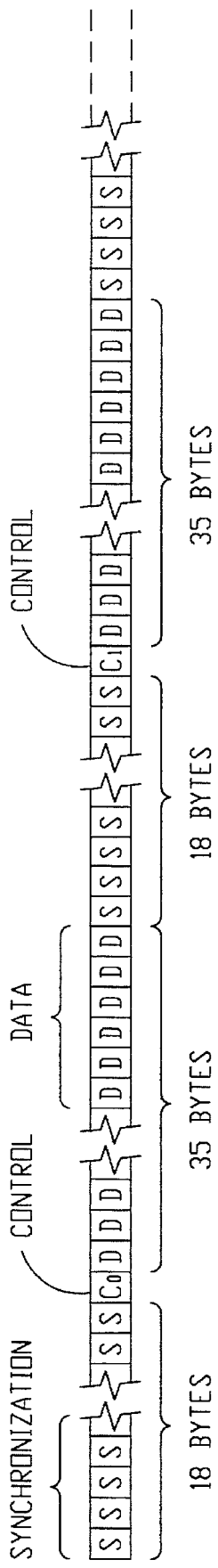
FIG. 3A is a depiction of an illustrative sequential pair of data packets transmitted during the synchronization phase of operation of the system of FIGS. 1 and 2.
Figure 3B:
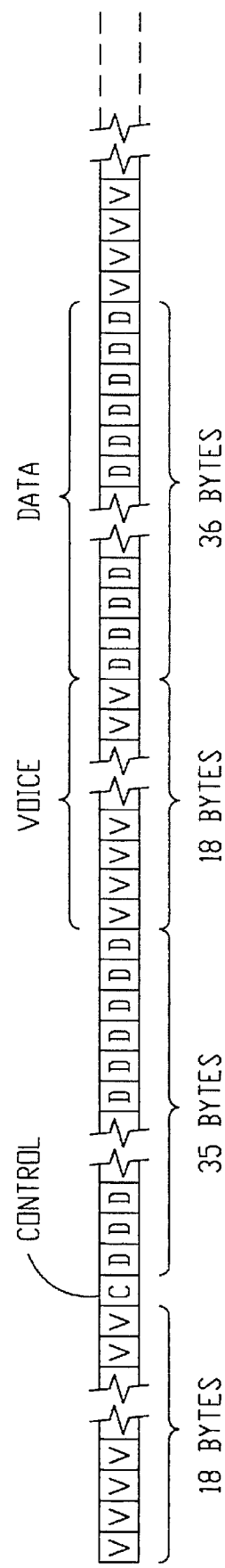
FIG. 3B is a depiction of an illustrative sequence of data packets transmitted after synchronization has been established between a pair of computer terminal locations.

As shown in FIGS. 3A and 3B, the preordained length of a data packet is 54 bytes. This includes 18 bytes for either synchronization characters or voice data, and 36 bytes for computer data transmission. One of the 36 bytes is selectively used for control data purposes. The location of the control byte is established during synchronization. Packets are transmitted and received every 30 milliseconds. This allocation was selected for 4,800 bps voice encoding and a 14,400 bps line transmission rate. Other allocations may be made, but once transmission is commenced, the packet length is fixed. For example, for a maximum line data rate of 11520 bps, a frame or packet having 18 voice bytes and 25 bytes of other digital data may be transferred every 30 milliseconds. In this example, the voice data rate is again 4800 bps and the host computer data rate is about 6530 bps.

Allocations within the packet are limited, but when no or only a single byte of data is to be transmitted, the allocation may be modified to that extent as reflected in the control byte.

In FIG. 3A, the "S" in 18 of the data byte locations is an ASCII character having no assigned meaning and is used as a synchronization character. This is followed by an eight bit control byte "C" and then by 35 digital data bytes "D". Once synchronization has been established, the 54 byte long packets depicted in FIG. 3B are transmitted. The control character "C" may be transmitted in every packet, every other packet, or every fourth packet as desired. As indicated in FIG. 3B, it is transmitted with every other packet.

Figure 4:
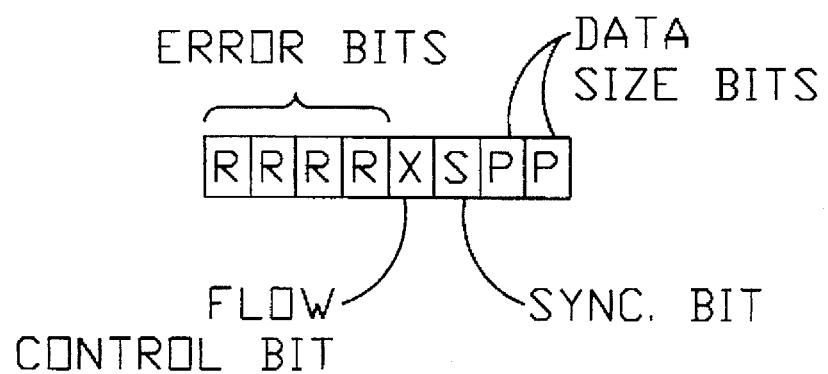
FIG. 4 is a depiction of an exemplary control byte.

The bit configuration of one example of a control character C is shown in FIG. 4. The single "X" bit is a flow control character used to start and stop the flow of host computer data from the remote system. This bit is used to indicate the elastic buffer 89 is in a full condition at the location sending the control byte and that no additional digital data should be sent. The single "S" bit represents local synchronization information and is used to signal the remote system that the local system has either acquired or lost frame synchronization. Upon receipt of a loss of synchronization indication, the remote system will begin transmitting the synchronization sequence of FIG. 3A. Another two bits are used to indicate the "size" of the data portion of a packet, that is, the allocation between voice and data within the fixed length packet. These indicate either that there is a single byte of data, a full 35 bytes, or that there is no data. This data information is carried by the two "P" bits in FIG. 4. These two bits of information may, for example, indicate that the following data packets contain no host computer data; that the following data packets contain one byte (or other unit) of host computer data; that all locations in the following data packets contain host computer data; or that all locations in the following voice and data packets contain host computer data. The four "R" bits are redundant bits used for error detection and correction, and for the detection of loss of local synchronization. Because of the particular Hamming code employed which detects all two bit errors and corrects all single bit errors, this exhausts the eight bit byte. Of course, other control indications, or other than an eight bit control byte may be used.

Figure 5A:
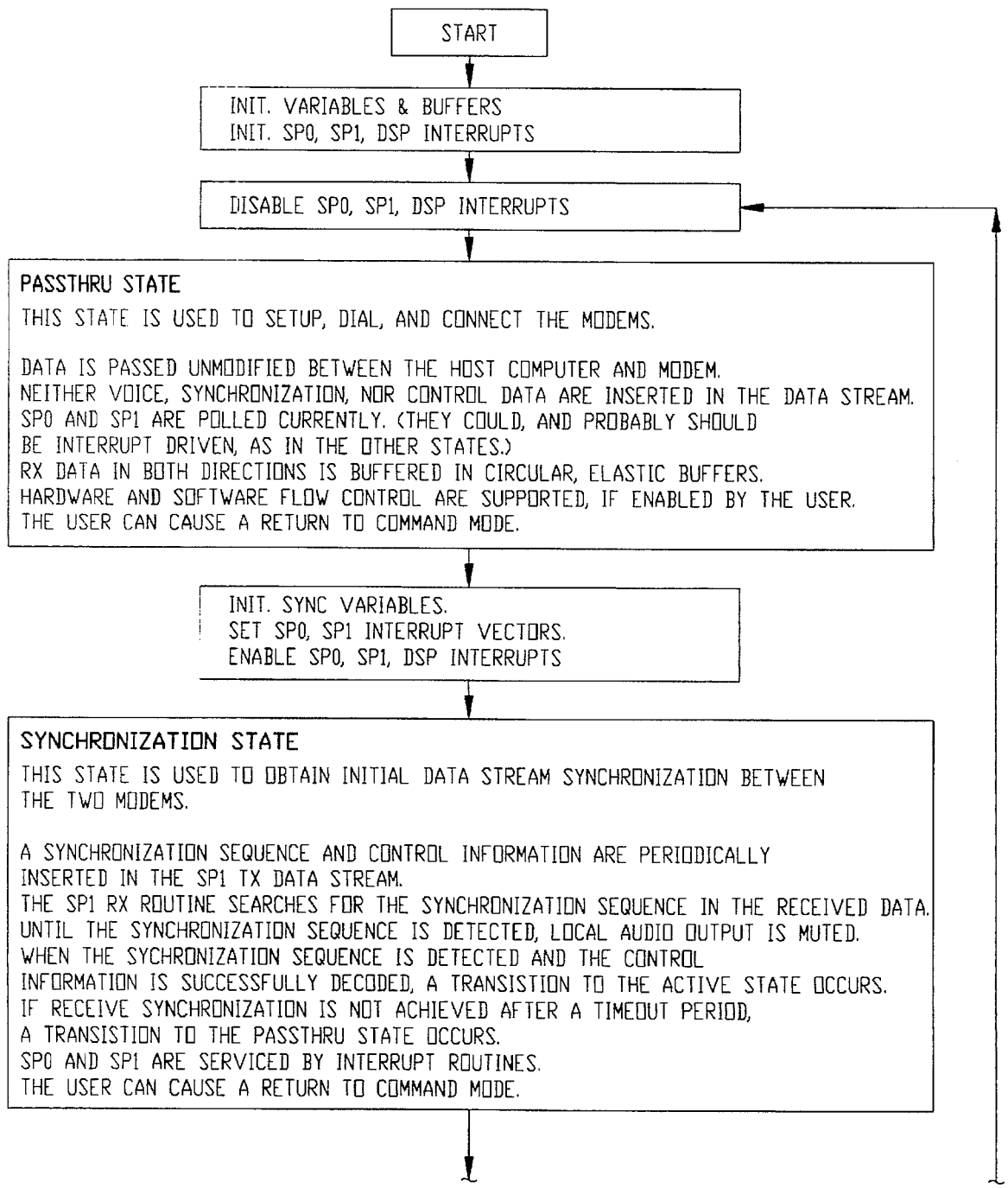
FIG. 5 is a state description of the overall operation of the present invention.
Figure 5B:
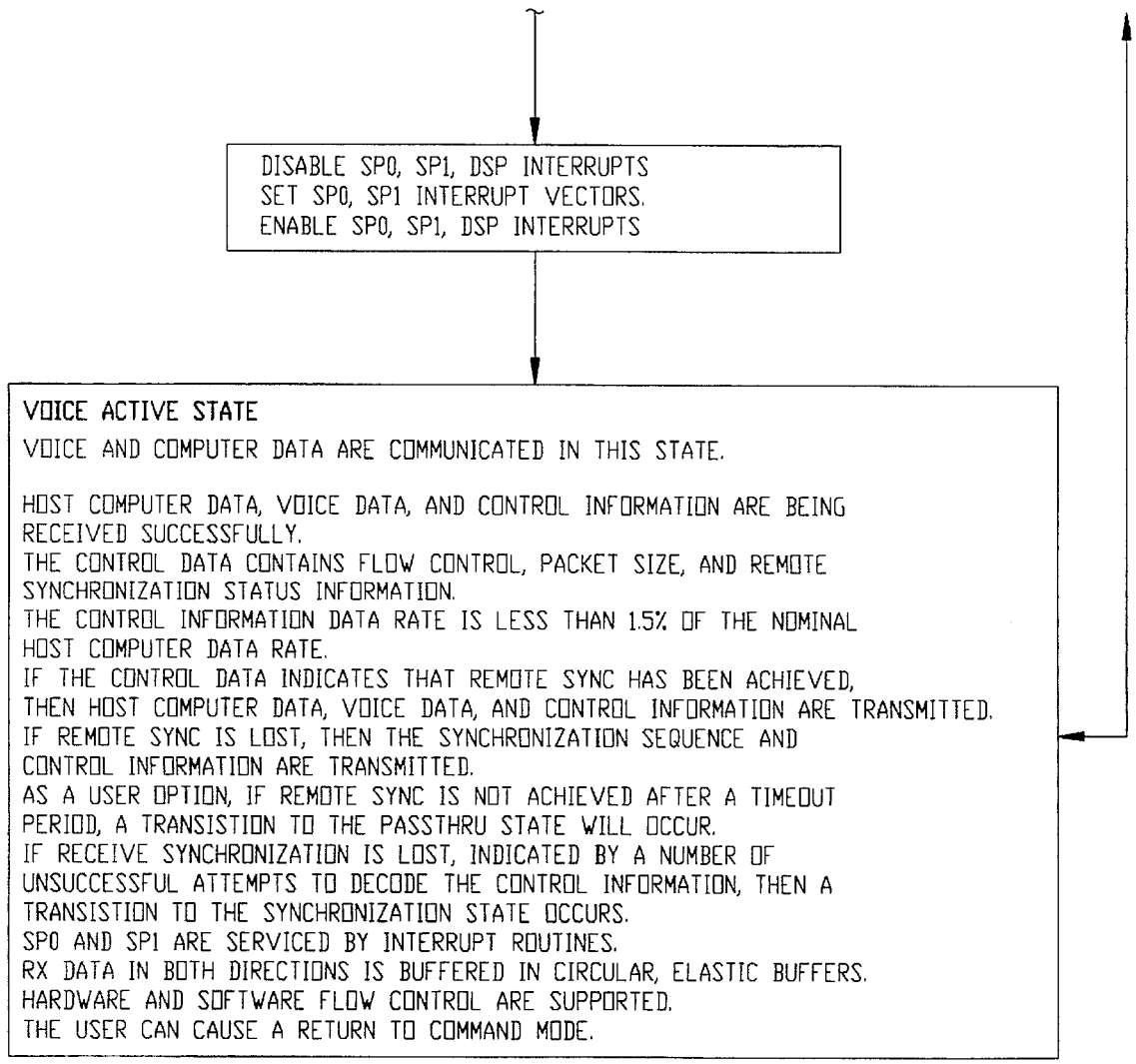
Figure 6:
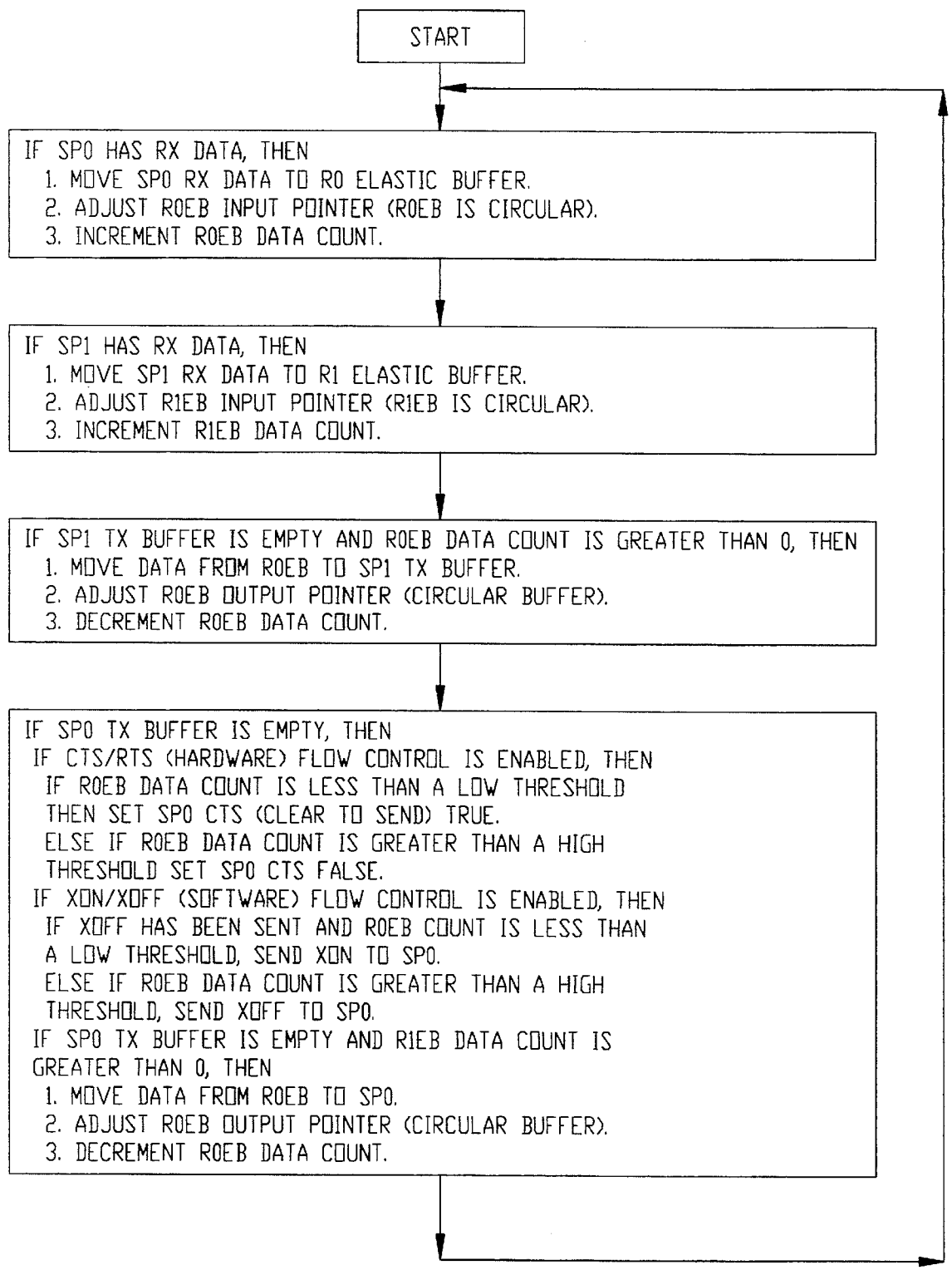
FIG. 6 is a more detailed state description of the PASSTHROUGH STATE of FIG. 5.

FIGS. 5–13 are a series of state descriptions of the overall operation of the invention in one implementation and are largely self explanatory. In FIG. 5 which is the general state description, SP0 represents the serial port or other interface to the host computer while SP1 represents the serial port or other interface to the modem as in FIG. 1A. If MNP or V.42 error control and data compression are included, then host computer data will transfer to and from these functions instead of directly to and from SP0. R0EB represents SP0 rx data elastic buffer 10 of FIG. 2C. R1EB represents SP1 rx data elastic buffer 89 of FIG. 2A.

In FIG. 7, host computer data may be sent in place of voice data if voice data does not need to be sent, for example, during periods when the local user does not need to talk to the remote user. Silence detection in the DSP could be used to indicate when it is not necessary to send voice data. Alternatively, a "push-to-talk" switch could be used. The control information already used to indicate data packet size would indicate to the remote computer that the voice data was replaced with computer data.

Figure 7A:
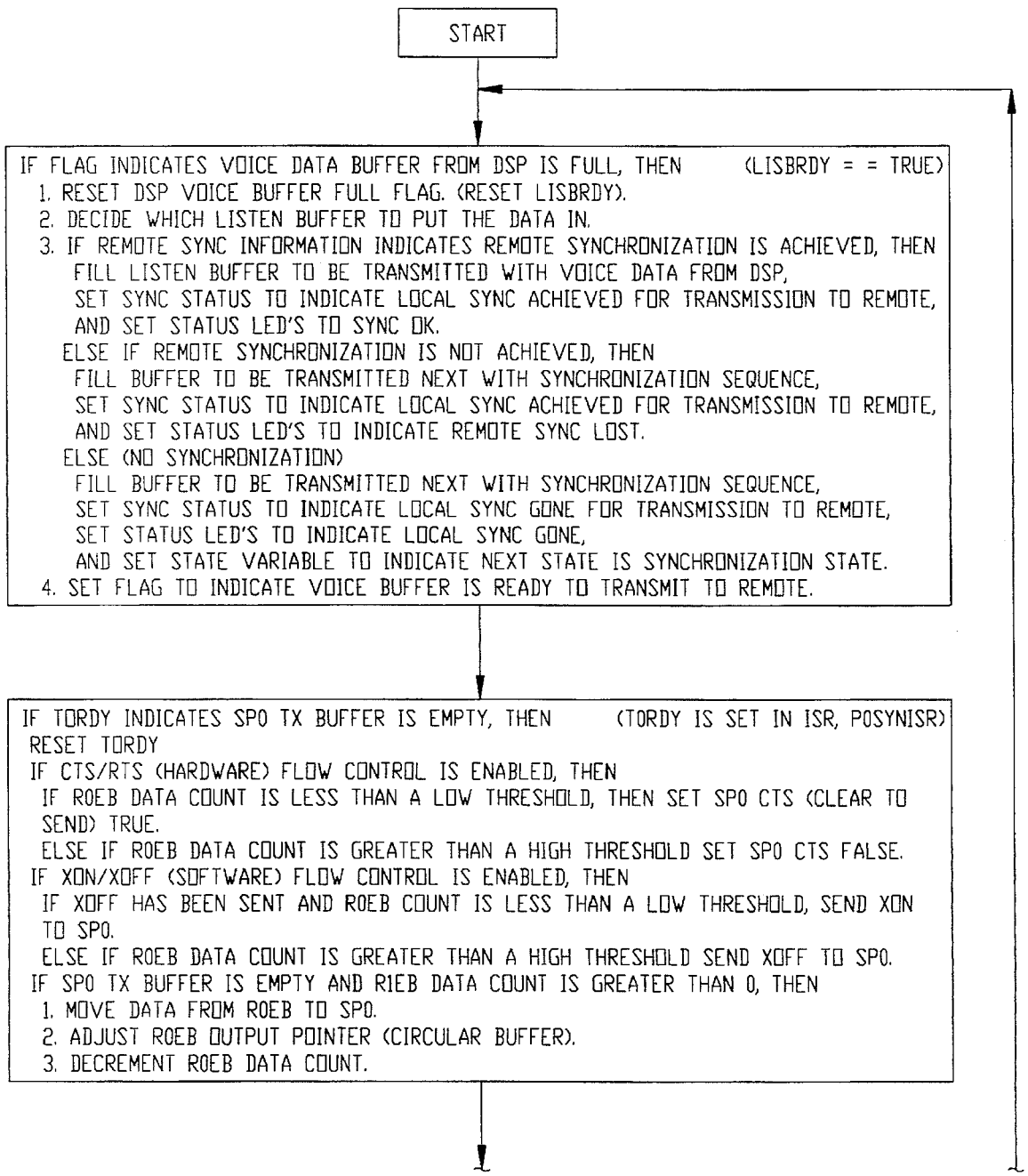
Figure 8:
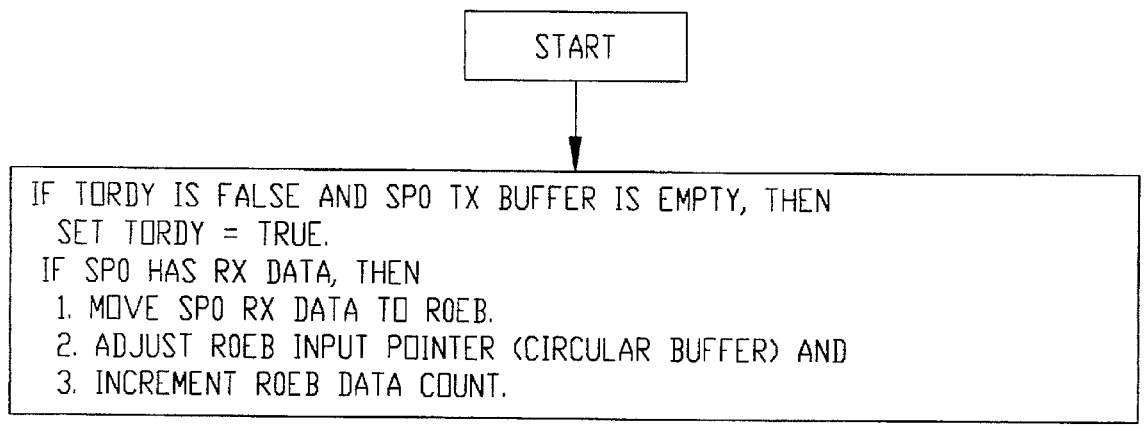
FIG. 8 is a detailed state description of the SYNCHRONIZATION STATE SP0 interrupt service routine.
Figure 9:
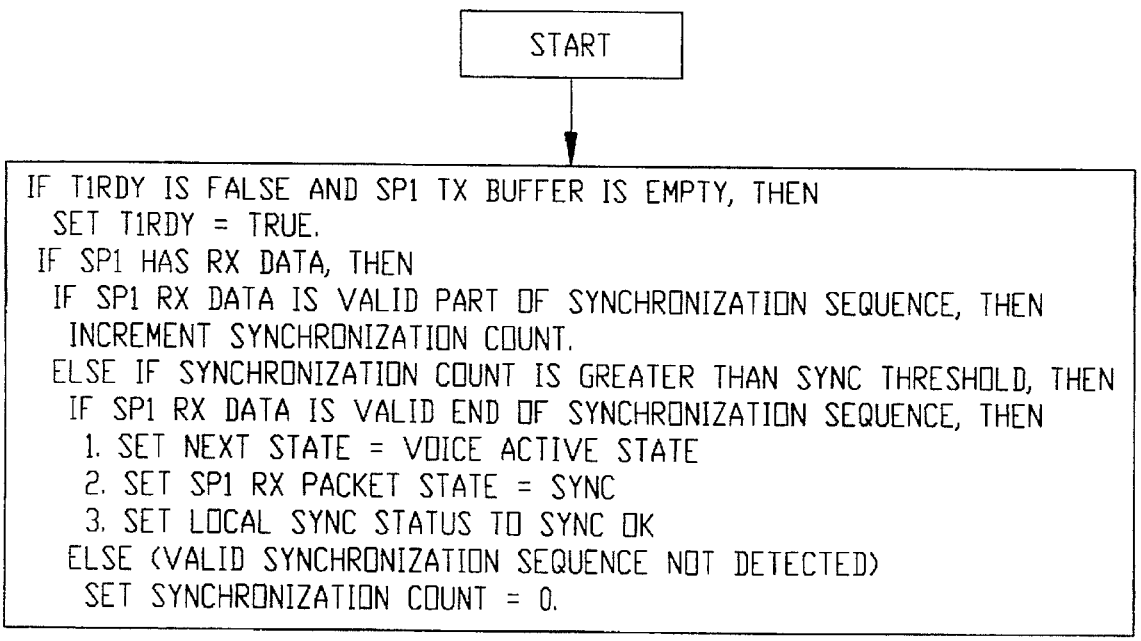
FIG. 9 is a detailed state description of the SYNCHRONIZATION STATE SP1 interrupt service routine.
Figure 10:
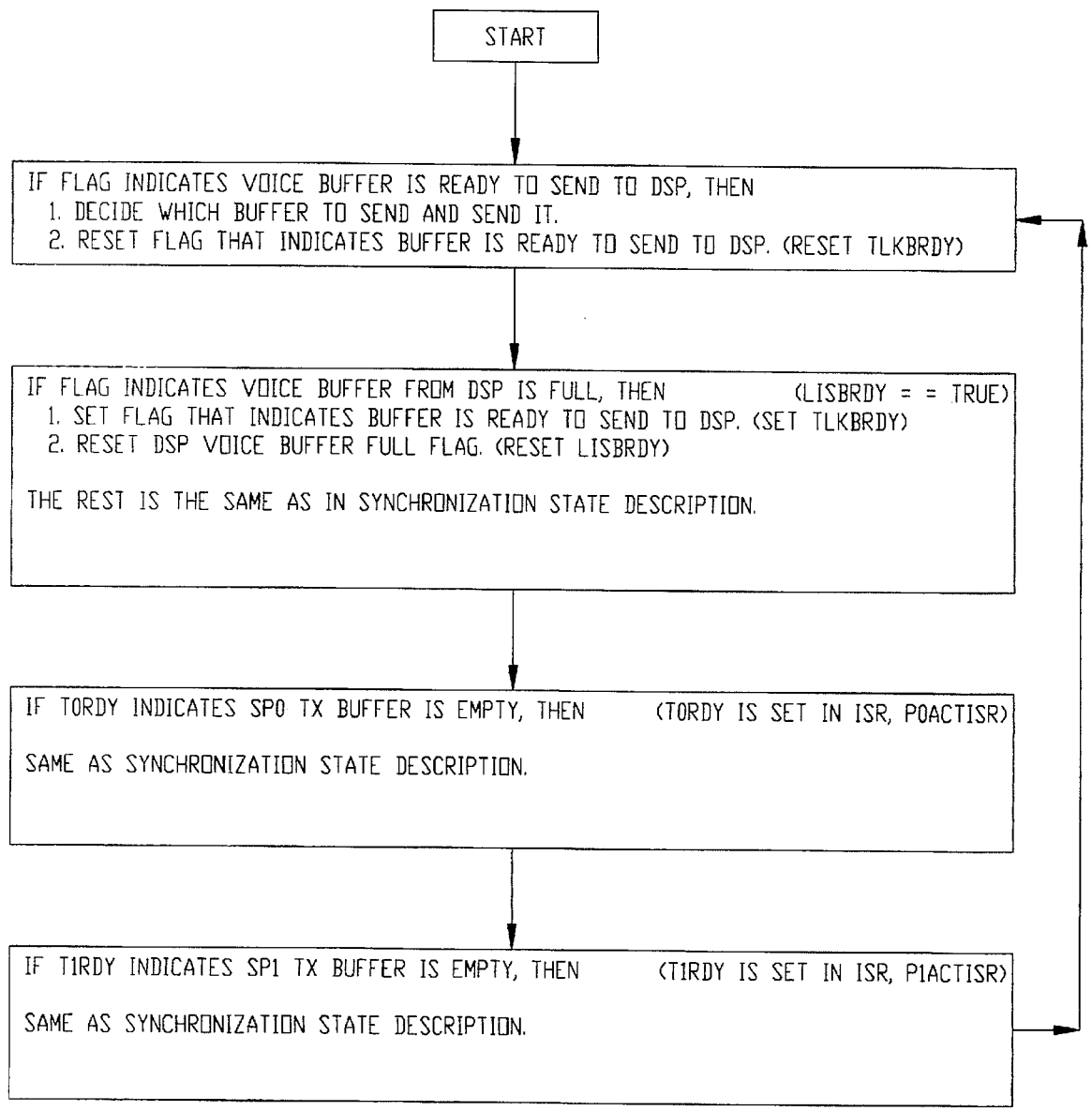
FIG. 10 is a more detailed state description of the VOICE ACTIVE STATE of FIG. 5.
Figure 11:
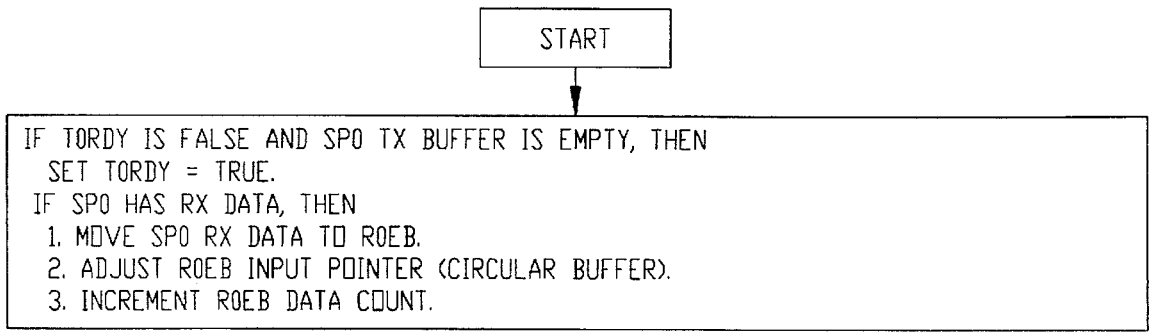
FIG. 11 is a detailed state description of the VOICE ACTIVE STATE SP0 interrupt service routine.
Figure 12:
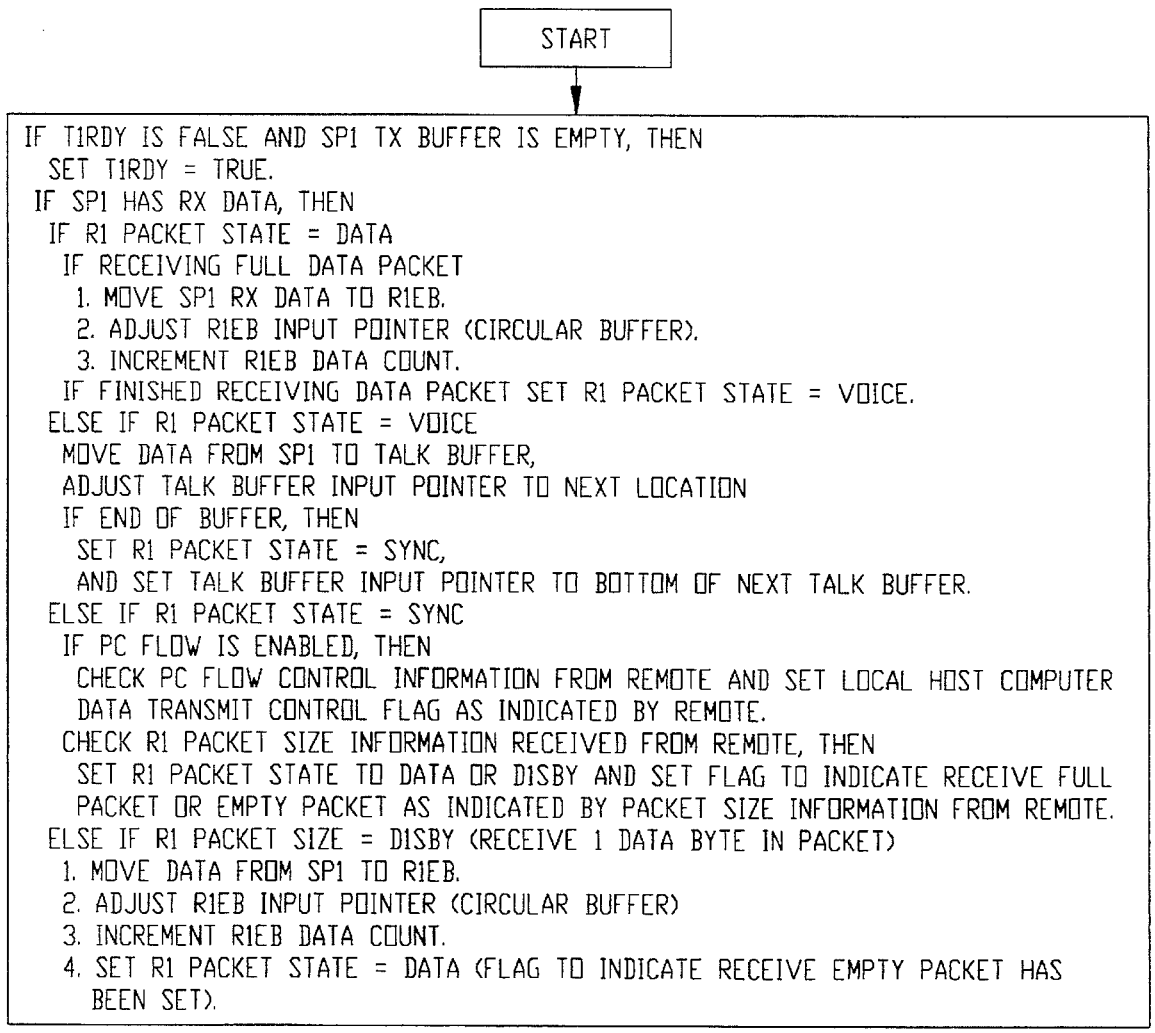
FIG. 12 is a detailed state description of the VOICE ACTIVE STATE SP1 interrupt service routine.
Figure 13:
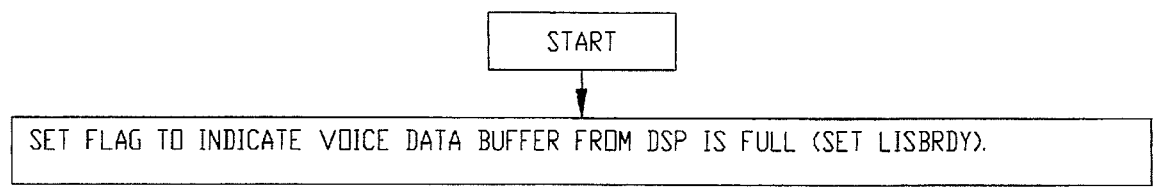
FIG. 13 is a detailed state description of the VOICE DSP interrupt service routine.

The P0SYNISR synchronization state SP0 interrupt service routine of FIG. 8 relates back to FIG. 7A and the P1SYNISR synchronization state SP1 interrupt service routine of FIG. 9 relates back to FIG. 7B. The POACTISR voice active state SP0 interrupt service routine and the P1ACTISR voice active state SP1 interrupt service routine both relate back to FIG. 10. In FIG. 13, the VDSPISR voice DSP interrupt service routine may be used for both the voice active mode of FIG. 10 and the synchronization mode of FIG. 7. The description shown for VDSPISR applies for an implementation in which the voice data packet is buffered in the DSP and the interrupt occurs when a complete voice data packet is accumulated. The voice data can also be transferred serially from the DSP and accumulated in a buffer by VDSPISR. For the latter case, VDSOUSR would write the voice data in a buffer and set LISBRDY when a full packet is accumulated in this buffer. Voice data sent to the DSP can be handled in a similar manner.

In summary, the invention has a number of advantages over known prior schemes including simplification of the timing and other "housekeeping" information which needs to be transmitted, thereby maximizing the transmission of useful information. The use of error correcting coding of control information provides a high reliability link and allows for the reliable automatic detection of loss of synchronization.

From the foregoing, it is now apparent that a novel arrangement has been disclosed meeting the objects and advantageous features set out hereinbefore as well as others, and that numerous modifications as to the precise shapes, configurations and details may be made by those having ordinary skill in the art. For example, while described as communication between a pair of computer terminal locations, the technique for accommodating three or more locations as in a conference call should now be readily apparent. This and other modifications will be readily apparent and may be made without departing from the spirit of the invention or the scope thereof as set out by the claims which follow.

What is claimed is:

1. The method of contemporaneous full duplex real time two-way voice and data communication between first and second computer terminal locations comprising:

transmitting from each of the first and second computer terminal locations a sequence of data packets with synchronization bytes in certain locations within each data packet;

receiving at each of the first and second computer terminal locations the transmitted sequence of data packets, and upon verified receipt thereof transmitting an acknowledgement of the receipt to indicate the establishment of synchronization between the two locations; and thereafter transmitting from each of the first and second computer terminal locations a sequence of data packets including, within certain ones of the data packets, control bytes including an acknowledgement of continued synchronization on the part of the receiving location, the portion of the packet dedicated to data transmission, and an indication to the transmitting location to start and stop the transmission of digital data in the data transmission data packet locations while continuing the transmission of voice data based on the ability of the receiving location to receive further data transmission.

2. The method of claim 1 including the additional step of continually analyzing the control bytes of received packets for an indication of loss of synchronization at the transmitting location and, upon receipt of an indication of such a loss of synchronization at the transmitting location, resuming transmitting from the receiving computer terminal location a sequence of data packets with synchronization bytes in said certain locations within each data packet.

3. The method of claim 1 including the additional step of continually analyzing received packets for an indication of loss of synchronization at the receiving location and, upon detecting an indication of loss of synchronization at the receiving location, transmitting from the receiving computer terminal location a sequence of data packets with an indication of loss of synchronization within the control bytes.

4. The method of claim 1 wherein the step of transmitting a sequence of data packets with synchronization bytes in certain locations includes modulating a carrier signal with the data packets and transmitting the modulated carrier signal over a voice transmission path, and the step of receiving includes demodulating the modulated carrier signal to recover the data packets.

* * * * *